Jan. 24, 1928.
J. HOPKINSON
1,657,083
WEIGHING SCALE
Filed Feb. 20, 1926
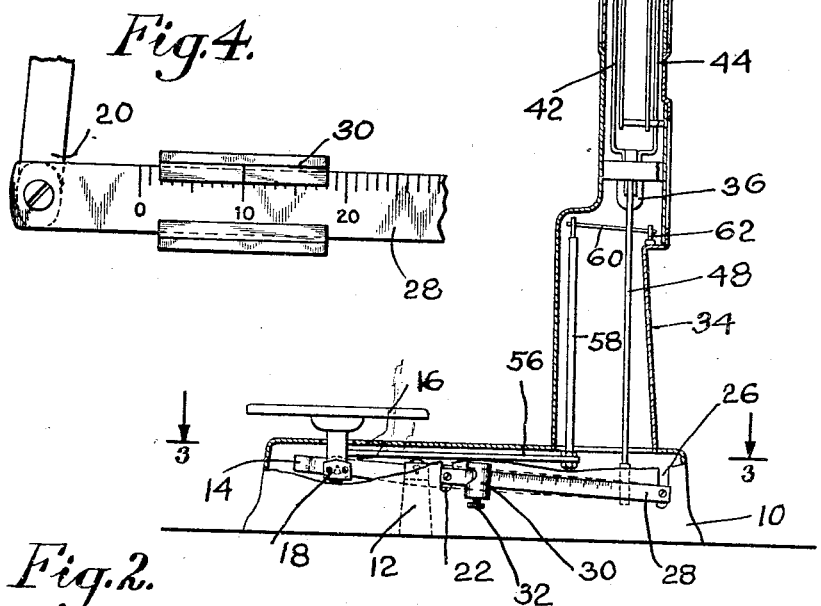
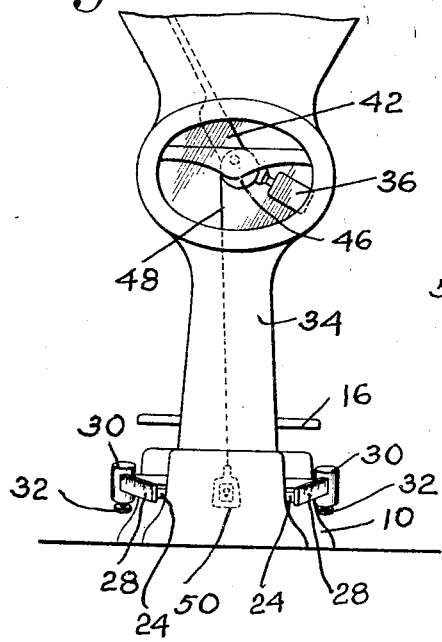
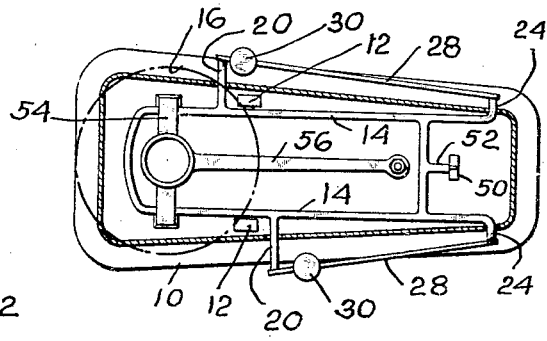
Inventor
Joseph Hopkinson
By his Attorneys
Cooper, Kerr & Dunham Patented Jan. 24, 1928.

1,657,083

UNITED STATES PATENT OFFICE.

JOSEPH HOPKINSON, OF DAYTON, OHIO, ASSIGNOR TO DAYTON SCALE COMPANY, OF DAYTON, OHIO, A CORPORATION OF NEW JERSEY.

WEIGHING SCALE.

Application filed February 20, 1926. Serial No. 89,552.

This invention covers improvements in automatic weighing scales, particularly of the type used on counters. In the use of such scales it is customary for the clerk or operator to be on one side of the scale and the customer on the other side. It is desirable that the customer be always able to check the weighing of goods and for that reason it is customary to provide a graduated chart and indicator on the customer's side of the scale. This enables him to watch the weighing operation so long as it is confined to the automatic chart. However, many scales are equipped with settable weights or beams with sliding poises by means of which the weighing capacity of the scale is increased beyond the chart capacity. It is necessary to know the position of the capacity weights or poises in addition to the indication on the chart in order to know the weight of the goods on the platform. Sometimes the beams carrying poise weights are graduated throughout their length and may then be used as tare beams as well as capacity beams. Beams are usually placed across the front of the scale and parallel to the counter. When so located the customer can not see the beams throughout their length because his view is obstructed by the housing of the scale. Such beams permit the use of capacity weights having operative positions only at the ends of the beams, but do not permit the use of the beams for tare purposes because when so used the poise is generally invisible to the customer.

The object of the present invention is to provide an improved arrangement of tare and capacity beams by which the beams may be used for tare or capacity purposes and are always readily readable by both the clerk and the customer. This is done by so designing the scale that the beam or beams may be placed on the sides of the scale, crosswise of the counter instead of lengthwise, and by so arranging the beams as to be readily readable to the customer as well as to the clerk.

Another object of the invention is to increase the weighing capacity of the scale by using two beams, one on each side of the scale. If two beams are placed on the same side of the scale, as they must be in the ordinary arrangement described above, the weight of beams and poises overhanging the bearings is sometimes enough to raise the pivots on the opposite side of the scale lever from their bearings and thus make the scale inoperative or at least inaccurate.

My present design is balanced with one beam and poise on each side of the scale so there is no tendency to raise any pivots from their bearings.

In the drawings,

Fig. 1 is a side view of the scale mostly in section.

Fig. 2 is a view of the scale from the customer's side.

Fig. 3 is a plan view on line 3—3 of Fig. 2.

Fig. 4 shows an optional arrangement of beam and poise.

The scale base 10 is provided with fulcrum bearings 12 in which rest the fulcrum pivots of lever frame 14. Frame 14 is in the form of a skeleton and supports the goods platform 16 in the usual manner on load pivots 18. Frame 14 has two arms 20 extending through slots 22 near the platform end of the base 10, and two arms 24 extending through slots 26 near the chart end of the base. Extending from arm 20 to arm 24 on each side of the scale is a graduated beam 28, each provided with a sliding poise 30 which may be locked in any desired position by thumb screw 32. In the preferred embodiment of my invention arms 20 are longer than arms 24. Therefore the beams 28 present their graduated faces at an angle toward the customer.

Standing upright on the customer's end of base 10 is the housing which encloses pendulum 36, front and rear charts 38 and 40 and their cooperating indicators 42 and 44. Pendulum 36 is provided with the usual rectifying cam 46 connected by tape 48 and yoke 50 to arm 52 projecting from main framed lever 14. Rigidly connected to the platform supporting structure 54 is the horizontal arm 56 extending within the base to a point below housing 34 to support the vertical member 58 of the check system of the scale. The check system is completed by check stay 60 which connects the upper end of member 58 to check stem 62 fast to housing 34. All the parts in housing 34 are shown in the drawings in conventional outline as they form no part of the present invention.

The framed lever 14, as illustrated, is a lever of the first order. Therefore pendulum 36 falls as the load on the platform increases. This kind of lever system requires that the end of the lever away from the platform be heavy enough to keep platform 16 and pendulum 36 in raised position when no load is on the platform. To add weight to lever 14 in my present design I provide that one beam 28 is shorter than the other so that its poise 30 is always on the opposite side of fulcrum 12 from the platform.

In operation all loads within the capacity of the chart or pendulum resistance are read directly on the chart. If a load greater than the chart capacity is to be weighed, one or both poises 30 are moved out on their beams 28 to assist the pendulum in balancing the load. Under such circumstances the weight of the load is ascertained by adding the weights indicated by the poises on the beams to the weight indicated on the chart.

If it is desired to know the net weight of goods in a package or container, one poise 30 is set to balance the container itself and the net weight of goods is then determined by the chart or by the chart in connection with the other poise.

The angular positions of beams 28 are such that the weights indicated by poises 30 are always easily readable by the customer as well as by the clerk who adjusts the poises.

In the arrangement illustrated in Fig. 4 beam 28 has its graduated surface horizontal instead of vertical, and poise 30 is open at the top, thus permitting both clerk and customer to have unobstructed views of the graduations and thereby accomplishing the same result as the arrangement previously described. With this optional arrangement of beam and poise it is not necessary that the beams converge towards the customer.

I claim—

1. In an automatic weighing scale, in combination, a base housing, a lever fulcrumed and disposed within said housing, and a tare beam supported for operation on each side of said lever and having connections to the lever which is within the housing.

2. In an automatic weighing scale, in combination, a base, a lever fulcrumed on said base, a platform supported by one end of said lever, a pendulum connected to the opposite end of the lever from said platform and a tare beam supported for operation on each side of said lever, the aforesaid platform being disposed upon said lever in such position that no portion thereof is above said tare beams whereby free access may be had thereto.

3. In an automatic weighing scale, in combination, a base, a lever of the first order fulcrumed on said base, a chart at right angles to said lever, an indicator cooperating with said chart, means operatively connecting said lever and indicator, and a tare beam operatively supported on each side of said lever.

4. In an automatic weighing scale, in combination, a base, a lever of the first order fulcrumed on said base, a platform supported by one end of said lever, a pendulum connected to the opposite end of the lever from said platform, a tare beam supported for operation on each side of said lever, a movable poise on each tare beam, and means to prevent at least one of said poises from being moved to the same side of the fulcrum as said platform.

5. In an automatic weighing scale, in combination, a base, a lever fulcrumed intermediate its ends on said base, a platform supported by one end of said lever, a pendulum connected to the opposite end of said lever from said platform, tare beams supported for operation on both sides of said lever, said tare beams diverging towards the platform end of said lever.

6. In an automatic weighing scale, in combination, a horizontal lever, and a tare beam operatively supported in the horizontal plane of said lever but divergent therefrom in that plane substantially as described.

7. In an automatic weighing scale, in combination, a lever, a chart at right angles to said lever and readable from both sides of the scale, and a tare beam operatively supported by said lever but divergent therefrom so as to be readable from both sides of the scale.

8. In an automatic weighing scale, in combination, a base, a lever fulcrumed on said base, a platform supported by one end of said lever, a vertical chart facing said platform above the opposite end of said lever, and tare beams supported for operation on both sides of said lever, said tare beams converging from the platform end towards the chart end of said lever.

9. In an automatic weighing scale, in combination, a lever, a chart at right angles to said lever, and tare beams operatively supported on both sides of said lever and readable by an operator upon one side of said chart and by another person situated upon the other side of said chart.

10. In an automatic weighing scale, in combination, a lever, and a tare beam supported for operation by said lever, a platform supported thereupon, said tare beam being graduated on its upper surface, said tare beams and platform being disposed in an offset manner relatively to each other so that said tare beam graduations are wholly visible from above with the platform in position upon the lever.

11. In an automatic weighing scale, in combination, a base, a lever fulcrumed on said base, a platform supported thereon, and a tare beam supported for operation on each side of said lever, said tare beams being graduated on their upper surfaces, said graduated beams being disposed upon the lever in such relative position with respect to the platform that the said graduated beams are wholly visible from above with the platform in position.

12. In an automatic weighing scale, in combination, a chart, an indicator cooperating with said chart, a main lever and a tare device supported by said lever, said tare device comprising a graduated tare beam located and arranged upon said main lever as to be readable simultaneously from both sides of said charts.

13. In an automatic weighing scale, in combination, a chart, an indicator cooperating with said chart, a main lever and a tare device supported by said lever, means operatively connecting the lever and indicator, said tare device comprising a plurality of graduated tare beams located and arranged upon said lever as to be readable simultaneously from both sides of said chart.

14. In an automatic weighing scale, in combination, a chart, an indicator cooperating with said chart, a main lever operatively connected to the indicator, and a tare device supported by said lever, said tare device comprising a graduated tare beam on each side of said lever, both beams being located and arranged upon said lever as to be readable simultaneously from both sides of said chart.

15. In an automatic weighing scale, a hollow base, a lever fulcrumed therein, and tare beams without the base and connected to the lever within the base for operation on each side of said lever, said tare beams having graduations thereon so located as to be readable simultaneously by operator and customer In testimony whereof I hereto affix my signature.

JOSEPH HOPKINSON.